Patented May 2, 1939

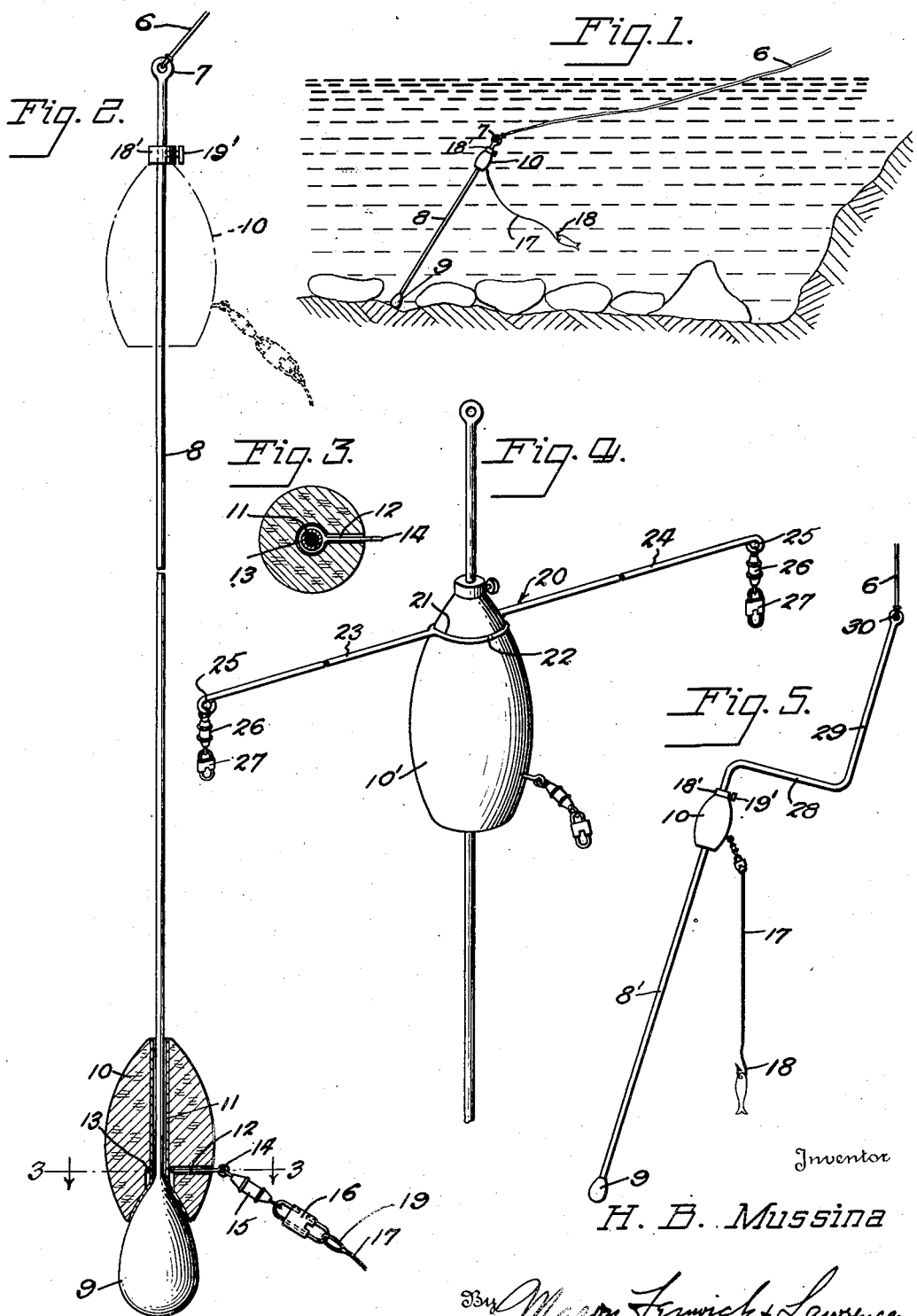

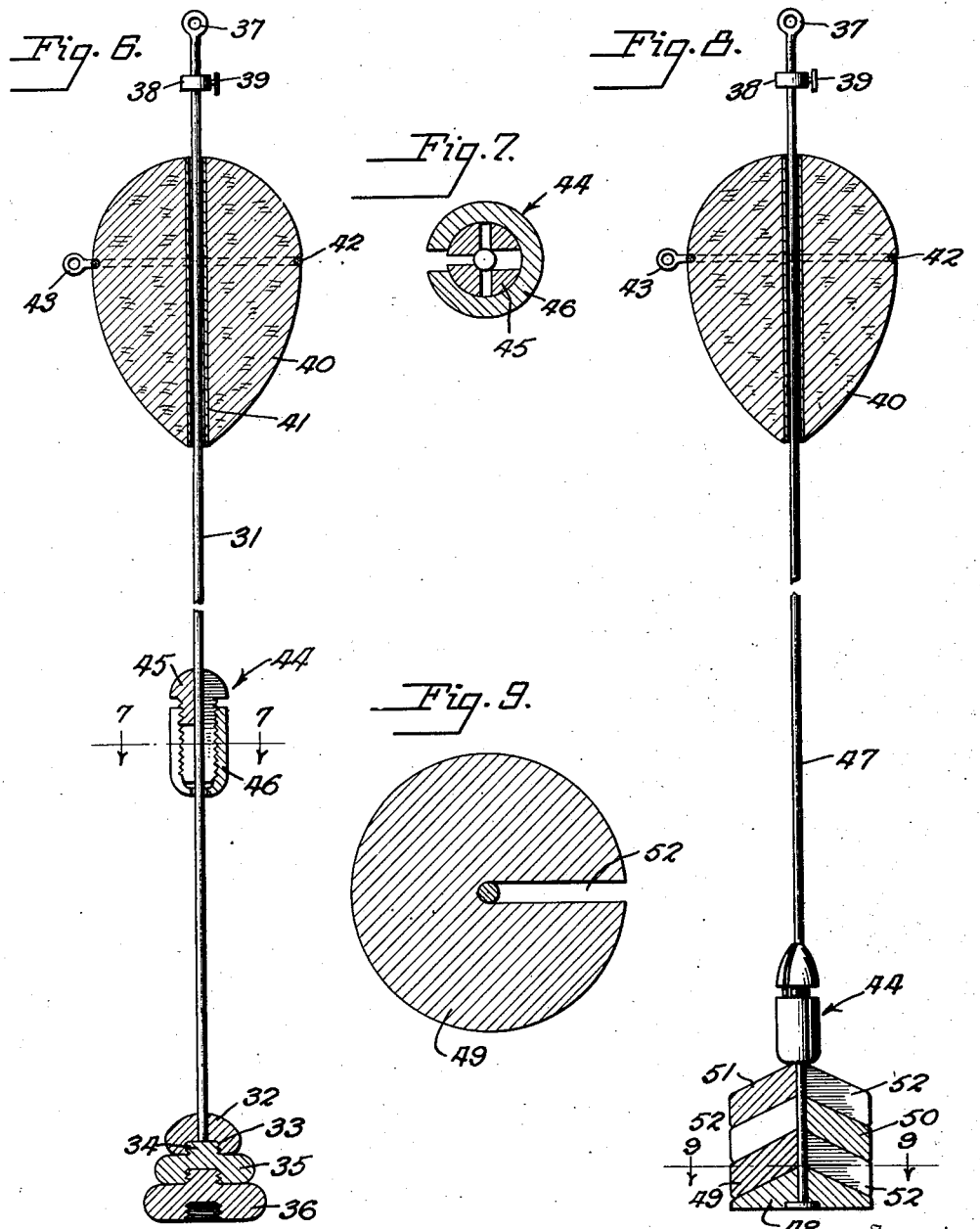

2,157,003

UNITED STATES PATENT OFFICE 2,157,003

FISHING APPARATUS

Henry B. Mussina, Williamsport, Pa.

Application April 29, 1938, Serial No. 205,098

10 Claims. (Cl. 43—27)

This invention relates to fishing tackle generally; and more particularly, to a device designed to support the hook and lure of fishing tackle at a predetermined distance above the bed of the body of water being angled.

In angling for certain kinds of fish, it is desirable to have hook and bait close to the bottom of the body of water. If the line of apparatus heretofore in common use is weighted to bring the hook to the bottom, it will either lie upon the bottom or become entangled in any growing plants or rocks, or other debris, which may cover the bottom.

The main object of the invention, therefore, is to provide a fishing apparatus in which the hook may be supported at any desired distance from the bottom.

Another object of the invention is to provide a fishing apparatus in which the distance of the hook support from the bottom may be varied and predetermined.

Other objects will become apparent as the detailed description thereof proceeds.

In the drawings:

Figure 1 is a perspective view showing one form of the invention in operative position;

Figure 2 is a view partly in elevation and partly in section of my invention interposed between the line and snell of the apparatus;

Figure 3 is a horizontal section taken on the line 3—3 of Figure 2;

Figure 4 is a perspective view of the apparatus illustrating the float thereof provided with a spreader;

Figure 5 is an elevation of a modified form of the device shown in Figures 1 and 2;

Figure 6 is a longitudinal section through a modified form of the invention;

Figure 7 is a horizontal section taken on the line 7—7 of Figure 6;

Figure 8 is a longitudinal section of a further modification of the invention; and Figure 9 is a horizontal section taken on the line 9—9 of Figure 8.

Referring to the drawings:

As shown in Figures 1, 2, and 3 of the drawing, the apparatus comprises a line 6 secured at its lower end to an eyelet 7 formed on the upper end of a steel sinker rod 8. A sinker 9 is suitably secured to or is formed integral with the lower end of the rod 8, and a float 10 is mounted to slide freely on the said rod.

Preferably the float 10 is bored axially large enough to receive a metal liner 1 which operates as a sleeve slidably mounted on the rod 8. The lower end of the float and liner are shaped to fit snugly over the upper end of the sinker 9.

Before the sleeve 11 is inserted in the axial bore of the float 10, the latter is bored radially to receive the shank of a fastener rod 12, having at its inner end an eye 13 large enough to encompass the straight part of the sleeve 11. An eyelet 14 on the outer end of the rod 12 is connected to one end of a swivel 15, the other end of which is connected to a spring clip 16. A snell 17 provided with the usual hook 18 at one end is provided with a loop 19 at its other end to be detachably connected to the clip 16. To predetermine the distance of the hook and lure above the bottom, the rod 8 has a collar 18 slidably mounted thereon and adapted to be secured in adjusted position by the set screw 19.

The operation of this form of the invention is illustrated in Figure 1 of the drawings. Out of water, the float 10 will normally be seated on the sinker 9. When thrown or cast into the body of water, the sinker 9 and its rod 8 sink to the bottom; but the float and the snell connected thereto rise on rod 8 until stopped by the collar 18. In this way, the hook and lure are held clear of the bottom without danger of becoming entangled with rocks or other debris covering the same.

The form of the invention shown in Figure 4 is similar to that shown in Figure 1 except for the addition of a spreader 20 which comprises a split ring 21 seated in an annular recess 22 formed in the upper part of the float 10'. Spreader arms 23 and 24 extend radially outward from the ring 21, and have eyelets 25 formed on the outer ends to receive the swivels 26 for the snell-supporting clips 27.

The form of sinker rod shown in Figure 5 is adapted for use in still waters. The lower part 8' of this rod is the same in every respect as the rod shown in Fig. 2. The upper end is bent to form an offset 28 which, in turn, is bent to form a continuation 29 of the rod 8' having at its upper end an eyelet 30 for connection to the line 6. As suggested by the inclined position of the rod 8' with respect to the line 6 in Figure 5, the weight of the laterally offset upper parts tends to incline the rod in the direction of the offset and thereby cause the snell with its hook to hang clear of the rod.

It will be evident that the length of the snell and the position of the collar 18 on the sinker rod will determine the position of bait end above the bed of the body of water, and will prevent live bait from secreting itself under the rocks and debris forming said bed.

In the form of the invention illustrated in Figures 6 and 7, the sinker rod 31 has a sinker 32 fixed to the lower end thereof. The sinker 32 has an internally screwthreaded bore formed in its lower surface co-axial with the rod 31, and adapted to receive detachably an externally screwthreaded projection 34 formed on a weight 35, which in turn, is provided with a similar bore to receive a similar projection on the weight 36.

It is obvious that any desired number of weights may be provided for adding to the total weight of the sinker. By this construction the total weight of the sinker can be varied to suit all conditions of water from still to very swift, or for trolling purposes.

The upper end of the sinker is provided with the usual line receiving eyelet 37; and a collar 38 may be secured in adjusted position on the rod 31 by means of the set screw 39 to limit the upward movement of the float 40. The float 40 is axially bored to receive the usual liner 41 and has its periphery grooved to receive a wire 42 adapted to be bent around and seated in said groove and to terminate in an eyelet 43, performing the same function as the eyelet 14 shown in Figure 2 of the drawings.

In addition to the sinker and float mechanism already described, the rod 31 is provided with an adjustable light-weight stop designated generally by the reference numeral 44. This stop 44 comprises a split-screw 45 for operating with the split-sleeve internally screwthreaded to receive the aforesaid screw. As shown in Figures 6 and 7 of the drawings, the construction of the screw 45 and the split sleeve 46 is such that both of these elements can be slipped on to the rod 31 laterally, and then rotated one within the other to clamp the stop 44 in any desired position of adjustment above the sinker at the lower end of the rod. The purpose of this adjustable stop is to limit the downward vertical movement of the float 40 so as to keep it from being pulled so far down that the live bait on the leader could reach the bottom of the water. In other words, the stop 44 serves to limit the vertical movement of the live bait between such limits above the bottom of the water as are found best suited to catch fish.

The form of the invention illustrated in Figures 8 and 9 differs from that shown in Figures 6 and 7 only by the construction of the adjustable sinker at the lower end of the sinker rod 47. With the exception of this sinker, the other elements on the rod 47 are the same as is shown in Figure 6 and are identified by the same reference numerals.

The rod 47 has a conical sinker 48 permanently secured to its lower end. The conical surface of the sinker 48 is adapted to receive in superposed relationship thereto a series of weights 49, 50 and 51, having their lower surfaces shaped to fit the conical surface of the sinker 48 and having their upper surfaces similarly shaped to receive superposed weights. Each of these weights 49, 50 and 51 is provided with a slot 52 of the same width as the diameter of the rod 47 to permit the weights to be readily added to or removed from position on the aforesaid rod.

It will be obvious that various changes may be made in the construction of this apparatus without departure from the spirit of the invention which is not to be considered as limited in any manner, except as indicated by the scope of the claims appended hereto.

What I claim is:

1. Fishing apparatus comprising a line, a rod connected at one end to said line and having a weight at its other end, a float slidably mounted on said rod, a hook connected to said float, and a stop on said rod to limit the upward movement of the float on said rod.

2. Fishing apparatus comprising a line, a rod connected at one end to said line and having a weight at its other end, a float slidably mounted on said rod, a hook connected to said float, a collar slidable on said rod to limit the upward movement of the float thereon, and means for fixing said collar in adjusted position on said rod.

3. Fishing apparatus comprising a line, a rod connected at one end to said line and having a weight at its other end, a float slidably mounted on said rod, a hook connected to said float, and a stop on said rod to limit the upward movement of the float on said rod, a support detachably connected to said float, spreader arms extending laterally from said support and hooks detachably connected to said arms.

4. Fishing apparatus comprising a line, a rod connected at one end to said line and having a weight at its other end, a float slidably mounted on said rod, a hook connected to said float, a collar slidable on said rod to limit the upward movement of the float thereon, means for fixing said collar in adjusted position on said rod, a support detachably connected to said float, spreader arms extending laterally from said support and hooks detachably connected to said arms.

5. Fishing apparatus comprising a line, a rod connected at one end to said line and having a weight at its other end, a float slidably mounted on said rod, a hook connected to said float and a stop on said rod to limit the upward movement of the float on said rod, said rod being laterally offset at its upper end to displace the center of gravity thereof.

6. Fishing apparatus comprising a line, a rod connected at one end to said line and having a weight at its other end, a float slidably mounted on said rod, a hook connected to said float, a stop adjustable on said rod to limit the upward movement of the float thereon, and a second stop adjustable on said rod to limit the downward movement of the float thereon.

7. Fishing apparatus comprising a line, a rod connected at one end to said line and having a weight at its other end, a float slidably mounted on said rod, a hook connected to said float, a collar slidable on said rod to limit the upward movement of the float thereon, means for fixing said collar in adjusted position on said rod, and a stop on said rod adjustable to limit the downward movements of the float thereon.

8. Fishing apparatus comprising a line, a rod connected at one end to said line, a float slidably mounted on said rod, a hook connected to said float, and a variable weight forming a sinker connected to the lower end of said rod.

9. Fishing apparatus comprising a line, a rod connected at one end to said line, a float slidably mounted on said rod, a hook connected to said float, a sinker weight fixed to the lower end of said rod, and sections adapted to be applied detachably to said rod to provide for variations in the weight of the sinker.

10. Fishing apparatus comprising a line, a rod connected at one end to said line, a float slidably mounted on said rod, a hook connected to said float, a sinker weight fixed to the lower end of said rod, and slotted weights adapted to be passed laterally onto said rod and over said weight to vary the total weight at the lower end of the rod.

HENRY B. MUSSINA.